United States Patent [19]

Gaspar

[11] 4,051,574
[45] Oct. 4, 1977

[54] SAUSAGE STUFFING DEVICE

[75] Inventor: Tobias A. Gaspar, South Dartmouth, Mass.

[73] Assignee: Gaspar's Linguica Company, Inc., South Dartmouth, Mass.

[21] Appl. No.: 735,805

[22] Filed: Oct. 26, 1976

[51] Int. Cl.² .......................................... A22C 11/02
[52] U.S. Cl. .......................................... 17/35; 17/41; 425/197
[58] Field of Search .................. 17/35, 36, 37, 38, 39, 17/40, 41, 42; 99/494, 538; 426/480; 137/547, 550; 425/197–199; 259/193

[56] References Cited

U.S. PATENT DOCUMENTS

| 80,035 | 7/1968 | Truxell | 17/38 |
|---|---|---|---|
| 965,384 | 7/1910 | Gebauer | 17/38 |
| 1,796,677 | 3/1931 | Wilson | 17/40 |
| 2,253,465 | 8/1941 | Tomlinson | 17/35 |
| 2,303,808 | 12/1943 | Wolcott | 137/550 |
| 2,619,674 | 12/1952 | Stem | 17/35 |
| 3,059,276 | 10/1962 | Yokana | 17/35 |
| 3,081,484 | 3/1963 | Schnell | 17/35 |
| 3,856,277 | 12/1974 | Tiramani | 425/197 |

Primary Examiner—Louis G. Mancene
Assistant Examiner—Paul J. Hirsch
Attorney, Agent, or Firm—Robert J. Doherty

[57] ABSTRACT

A device for use with a sausage stuffer having a first tubular conduit forming a flow passage for sausage mix and a laterally orientated second tubular conduit intersecting and disposed generally normal to said first conduit and laterally offset therefrom, a member positioned within the second conduit and extending entirely across the flow passage and laterally outwardly thereof into said second conduit, said member being provided with a plurality of slotted openings of reduced cross-sectional configuration to entrap undesirable hard particles within sausage mix such as bone, gristle, and the like so that such may be subsequently removed by way of said second conduit.

9 Claims, 6 Drawing Figures

SAUSAGE STUFFING DEVICE

BACKGROUND OF THE INVENTION

Sausage stuffing devices ranging from relatively simple hand operated mechanisms to large, fairly complex automated devices are well known and commonly utilized throughout the industry. Such devices necessarily include means for holding and pressurizing the sausage mix and some confining conduit normally referred to as a horn whereby sausage mix may be direced into a sausage casing and the like in order to form a finished product. Dependent, of course, upon the source or sources of the material comprising the sausage mix such material may include in addition to edible portions such as both skeletal and non-skeletal meat, material normally considered edible such as relatively hard or tough components including bone, gristle, tendons, etc. Naturally, the less such hard particles present in the finished sausage product enables a more appetizing and easily chewed and digested product to be presented to the consuming public. Also substantial removal thereof would serve to additionally reduce potential injury to consumers i.e., damaged teeth and/or dentures.

Accordingly, attempts have been made in the past to reduce or limit the amount of such undesirable hard particles within finished products. Generally, such attempts took the form of the inclusion of a strainer element logically positioned downstream of the mix reservoir and upstream of the stuffing horn. Various such strainer configurations are depicted in the following U.S. Pat. No.: 80,035 issued July 14, 1868; U.S. Pat. No. 1,796,667 issued Mar. 17, 1931; and U.S. Pat. No. 2,253,465 issued Aug. 19, 1941.

In addition to such above-indicated devices, it is also known to remove totally foreign material from such sausage mix as by the magnetic removal thereof as indicated in U.S. Pat. No. 2,619,674 issued Dec. 2, 1952. Also, more recently, devices which attempt a higher recovery of edible meat portions from material containing both edible and normally inedible components have been introduced such as the devices et forth in U.S. Pat. No. 2,734,540 issued Feb. 14, 1956 and U.S. Pat. No. 3,906,118 issued Sept. 16, 1975.

No straightforward, relatively simple device, however, exists for removing hard particles from sausage mix wherein the strainer orifices thereof are not unduly restrictive to continued flow mix or which otherwise do not require overly complex or expensive machinery.

SUMMARY OF THE INVENTION

It is accordingly an object of the present invention to provide a device of the aforementioned type which can effectively and simply remove hard particles from sausage mix in a relatively inexpensive manner and one in which does not interfere with the continued flow of mix for the stuffing of sausages and the like.

A further object of the present invention is the provision of a device having means by which hard particles contained within a sausage mix passing through a flow passage under pressure may be temporarily restrained or suspended in such flow passage in such a manner that they may be periodically removed in a simple and uncomplicated fashion at periodic intervals during the use of the sausage stuffing device incorporating such invention.

A still further object of the present invention is the provision of a device for removing hard particles from sausage mix wherein a strainer member is positioned generally normal to the flow of sausage mix through a first conduit in such a manner that relatively hard particles restrained thereby are moved to positions within a second conduit laterally offset from the flow passage so as not to interfere with continued flow of sausage mix therethrough.

Still another object of the present invention is the provision of a device of the immediately aforementioned type wherein such restraining member may be positioned in alternate operational modes within its encompassing second conduit in such a manner so as to facilitate its removal and/or reinsertion thereinto.

These and other objects of the present invention are accomplished by a device for removing hard particles from sausage mix and the like comprising, a longitudinally orientated first tubular conduit forming a flow passage for said sausage mix under pressure therethrough, a laterally orientated second tubular conduit intersecting and disposed generally normal to said first conduit so that at least portions of said second conduit are laterally offset from said flow passage, a member positioned within said second conduit and extending entirely across said flow passage, said member including a plurality of continuous slotted openings having a cross-sectional configuration narrowing in the flow direction of said mix disposed therethrough, at least portions of said openings extending at least partially across said flow passage and extending laterally outwardly of said flow passage at least partially into said second conduit.

Additionally, other features and advantages of the invention shall become apparent as the description thereof proceeds when considered in connection with the accompanying illustrated drawing.

DESCRIPTION OF THE DRAWING

In the drawing which illustrates the best mode presently contemplated for carrying out the present invention.

DESCRIPTION OF THE INVENTION

Figure 1:
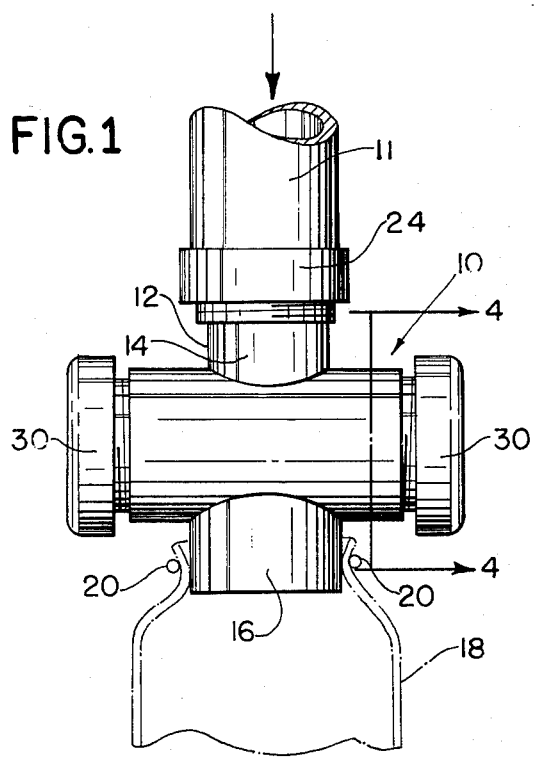
FIG. 1 is a partial front elevational view in somewhat stylized form of a sausage stuffing machine incorporating the device of the present invention.

Referring now to the drawing and particularly FIG. 1 thereof, the device 10 of the present invention is depicted as mounted on the exit end of a stuffer horn 11 of a sausage stuffing machine (not entirely shown.) The device 10 may take the form as depicted of a cross-T connection having a first conduit 12 including an upper section 14 adapted to receive sausage mix under pressure and an exit portion or horn extension 16 through which the treaded sausage mix is adapted to outwardly pass as into a sausage casing 18. The outer configuration of the horn extension 16 may be altered to better accept the reduced neck portion of the sausage casing 18 for positioning thereon as by an elastic member 20 as is known in the art. The overall construction of the device 10 may be from stainless steel so as to be readily acceptable in the food industry or in those cases where the device may be utilized to strain hard particles from nonfood products various other suitable material may be utilized. It should also be pointed out that the term sausage mix as used herein includes other comestibles such as hamburg and may as well include noncomestibles having similar physical characteristics.

The upper section 14 generally is further provided with a threaded terminal portion or boss 22 for connection with a mating portion or collar 24 provided on horn 12 for interconnection therewith. Such first conduit 14 in effect forms a passage 26 therethrough. The device 10 also includes a second conduit 28 intersecting with and generally positioned normally to the first conduit 14 and provided at least at one end thereof with a removable end cap or other closure means 30 suitably secured thereto as through the provision of an outwardly threaded reduced neck portion 32. The other end thereof is preferably also provided with a similar construction so as to include an opening which also may be closed by an end cap 30 disposed on a similar reduced outwardly threaded neck portion 34 and in such a manner it insures that the internal portions of the second conduit 28 are completely accessible for cleaning through such end openings.

Figure 2:
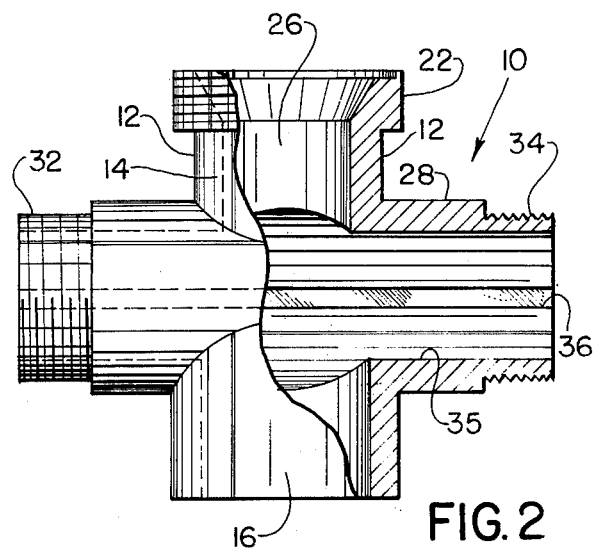
FIG. 2 is a front elevational view similar to FIG. 1 but on a larger scale showing the device of the present invention with parts broken away and sectioned for purposes of clarity.
Figure 3:
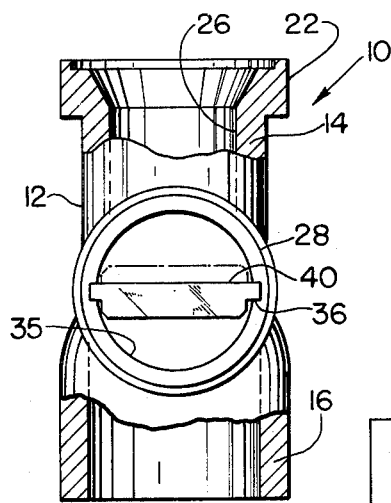
FIG. 3 is a side elevational view of the device shown in FIG. 2 also with parts broken away and sectioned and the alternate positioning of the removable member shown in phantom lines.
Figure 4:
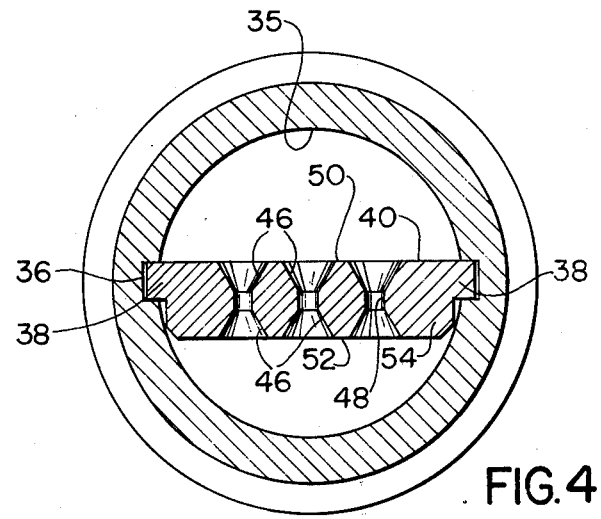
FIG. 4 is a sectional view on still a larger scale taken along the line 4—4 of FIG. 1.
Figure 5:
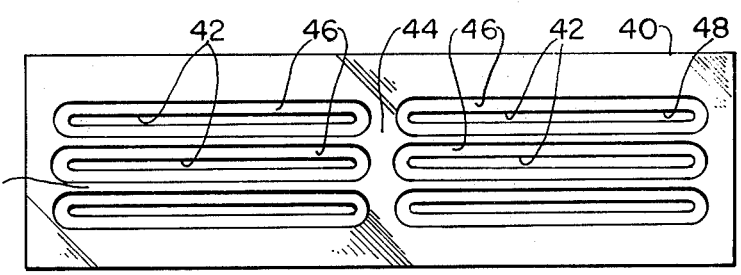
FIG. 5 is a top plan view of one form in which the strainer member of the present invention may take.
Figure 6:
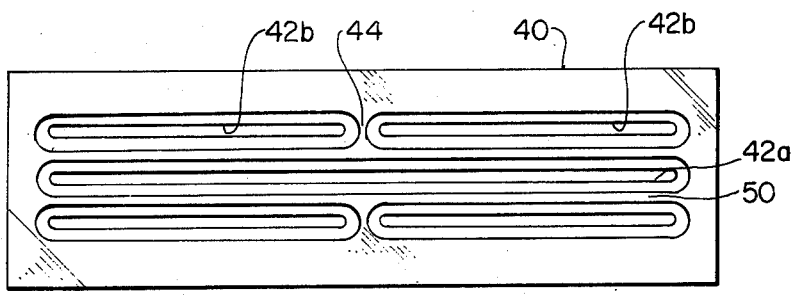
FIG. 6 is a top plan view of another form which such strainer member may take.

As best may be seen by reference to FIGS. 2 through 4, the internal passage 35 of the second conduit is provided with a pair of recesses 36 disposed in opposed position from each other and in turn adapted to receive in slidable engagement therewith the outwardly extending flanges 38 of a strainer member 40. As depicted, the strainer member 40 is adapted for positioning in a generally normal position to the flow of mix passing through the passageway 26 of the first conduit 14 and is, as best shown by FIGS. 5 and 6 provided with a plurality of slotted openings 42 disposed in generally parallel relationship to each other laterally across the width of such member 40. The openings may be disposed longitudinally generally along the entire length of the member 40 as shown by opening 42a of FIG. 6 or may be separated as shown by slots 42b in FIG. 6 so as to define an integral web 44 disposed therebetween. Such web is disposed generally centrally of the flow passage 26 when the member 40 is positioned within the second conduit 28 and extends generally normal to such passage and provides portions thereof that laterally outwardly extend into the second conduit proper.

The cross-sectional configuration of the openings 42 is preferably that of an hourglass having inwardly sloping entrance portions 46 and a midsection 48 of reduced diameter. In this way then, sausage mix moving along the passage 26 is free to move through the openings 42 and thus into the casing 18, the pressure under which such action is accomplished tending to flatten out soft meat particles so that they are forced through the slot 42 whereas harder particles such as gristle or bone become hung up, wedged, or caught therein so as to become temporarily suspended within passageway 26 by reason of the member 40. Naturally if several hard particles become suspended as above indicated, such could reduce the available area through which the mix may pass and accordingly the slots 42 are of a longitudinal extent which is substantially greater than that of those portions of the passageway 26 in which they are positioned so that the flow of mix passing centrally tends to be diverted along outwardly directed paths by means of the central web 44 and in this manner tend to force the hard particles hung up within the slots 42 outwardly in either direction away from the passageway 26 and into outer portion of the second conduit 28. Such action and configuration of the slotted member 40 enables longer stuffing intervals to be conducted before the necessity of cleaning the member arises. Such cleaning is facilitated by the openings provided by the removable end caps 30 above discussed whereupon the member 40 may simply be forced laterally outwardly from the second conduit 28, cleaned and reinserted.

Inasmuch as the entire internal cavity of the device 20, that is, both conduits 14 and 28 are filled at least to some extent with mix during operation, the possibility exists that the recesses or one of the openings when only one end cap 30 is removed may become plugged with material and in order to facilitate the reinsertion of the strainer member 40 along such recesses, the flanges 38 thereof are purposely not centered along the thickness of the plate so as to present alternate surfaces 50 and 52 which may be presented to the oncoming stream of mix. One such surface i.e., 52 is shown supported upon a reduced width portion 54 of the plate 40 so that such reduced width portion 54 may be alternately upwardly disposed (as shown by the phantom lines in FIG. 3) within the second conduit 28 and in this way in case its reinsertion is blocked in one such position it can be turned over and reinserted in the alternate position.

It should be pointed out that the width of the slots 42 can be varied depending on the density and particle size of the Furthermore, it has been specifically found that a slot having an ⅛ inch opening at the reduced portion 48 thereof is suitable for a mix having meat particles ranging from ¼ to ½ inch along their largest dimension and that openings 3/16 of an inch wide are suitable for meat particles in ¾ inch chunks. Use of the device of the present invention resulted in sausages in which upon examination almost no hard particles i.e. bone or gristle were found.

It is accordingly believed that the construction set forth above presents a simple, straightforward, easily cleaned, and quickly manageable device which accomplishes the desired objectives of the present invention and one which is not overly expensive to produce.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for removing hard particles from sausage mix and the like comprising, a longitudinally orientated first tubular conduit forming a flow passage for said sausage mix under pressure therethrough, a laterally orientated second tubular conduit intersecting and disposed generally normal to said first conduit so that at least portions of said second conduit are laterally offset from said flow passage, a member positiond within said second conduit and extending entirely across said flow passage, said member including a plurality of continuous slotted openings having a cross-sectional configuration narrowing in the flow direction of said mix disposed therethrough, at least portions of said openings extending at least partially across and generally normal to said flow passage and extending laterally outwardly of said flow passage at least partially into said offset portions of said second conduit and means operatively associated with said second conduit to gain access to said member for removal therefrom.

2. The device as set forth in claim 1, wherein said second conduit extends laterally outwardly to opposite sides of said flow passage.

3. The device as set forth in claim 2, wherein said members include an imperforate web portion positioned generally centrally of said flow passage whereby said mix is diverted laterally outwardly thereby towards said laterally offset portions of said second conduit.

4. The device as set forth in claim 2, wherein said member is a generally flat plate having outwardly extending edge portions in turn slidably engaged in opposed recesses formed in either side of said second conduit.

5. The device as set forth in claim 4, where said opposed recesses extend substantially the entire length of said second conduit.

6. The device as set forth in claim 4, wherein said plate outwardly extending edge portions are in the form of opposed flanges, each such flange of a thickness less than the full extent of said member so that the flat portions of said member inwardly disposed of said flanges may be alternatively positioned upwardly or downwardly within said flow passage.

7. The device of claim 6, wherein said material passage openings are of hour glass cross-sectional configuration.

8. The device of claim 4, at least some of said slotted openings being laterally disposed to one another.

9. The device of claim 8, wherein one of said slots is disposed generally entirely along the longitudinal extent of said second conduit and wherein separate slots are positioned on either side thereof, said separate slots being separated by a web portion.

* * * * *